United States Patent

[11] 3,566,830

[72] Inventor Hermann Jakob Flamm
 Bournemouth, England
[21] Appl. No. 764,160
[22] Filed Oct. 1, 1968
[45] Patented Mar. 2, 1971
[73] Assignee United Kingdom Atomic Energy Authority
 London, England
[32] Priority Oct. 9, 1967
[33] Great Britain
[31] 46028/67

[54] FLUIDISED BED APPARATUS
 3 Claims, 3 Drawing Figs.
[52] U.S. Cl. .................................................. 118/48,
 118/308
[51] Int. Cl. ............................................ C23c 11/10

[50] Field of Search ........................................... 118/47, 48,
 62, 303, (DIG) 5; 239/(Inquired); 23/(Inquired),
 288, 284; 117/(Inquired), 100

[56] References Cited
 UNITED STATES PATENTS
 3,110,626 11/1963 Larson et al. ................. 118/303

Primary Examiner—Morris Kaplan
Attorney—Larson, Taylor and Hinds

ABSTRACT: A fluidized bed vessel has a fluid injection assembly arranged to inject process gas and fluidizing fluid into the vessel via separate coaxial orifices. The construction of the assembly is such as to provide two annular injection orifices for fluidizing fluid. These orifices serve to direct fluidizing fluid over the wall of the vessel and over the process gas injection orifice. The assembly gives fine control over the concentricity of the orifices.

FLUIDISED BED APPARATUS

This invention relates to fluidized bed apparatus for the coating of particulate material. It has already been proposed to apply a coating to particles by pyrolytic deposition of carbon or silicon carbide from a gas or vapor The high temperature required for the deposition of these substances has necessitated that the conduit conveying the gas or vapor to the fluidized bed be cooled below the decomposition temperature of the gas or vapor as far as the point of injection into the fluidized bed.

Moreover, with a view to minimizing the deposition of carbon on the walls and other surfaces adjacent to the injection point, dual aperture nozzle arrangements have been proposed with the object of distributing a flow of inert fluidizing gas over the surfaces of the bed apparatus around the zone in which the reaction takes place.

Difficulties arise, however, in arriving at a design in which a high degree of concentricity of the several coaxial flow passages is preserved and whereby a uniform distribution of gas can be achieved. A uniform distribution of inert fluidizing gas is desirable because it can be instrumental in preventing deposits of coating substances on the surfaces of the apparatus which may interfere with the coating process.

According to the invention there is provided a fluidized bed apparatus for the coating of particulate material or articles by pyrolisis of a fluid, the apparatus comprising a process vessel, a fluid injection assembly having prospective coaxial inlets for fluidizing and process fluids, the inlet for fluidizing fluid being disposed to inject fluid around the process fluid inlet in at least two separate streams some of which are directed by said fluidizing fluid inlet over the process fluid injection orifice and others over the interior surface of the interior surfaces of the vessel.

Thus, an inlet for process fluid may be provided by the mouth of a tube having external longitudinal grooves to provide coaxial channels for fluidizing fluid. Near the mouth of the tube, the tube preferably supports a ferrule which serves to divide the flow from the grooves into two annular jets one of which discharges about the mouth of the tube. The other may be defined between the ferrule periphery and the flared extensions of the bore in the bottom of the vessel through which the bore tube protrudes. In this way, the annular discharge clearances for the jets are preserved accurately coaxial with one another.

One form of fluidized bed coating apparatus embodying the invention will now be described with reference to the accompanying drawings in which.

Figure 1:
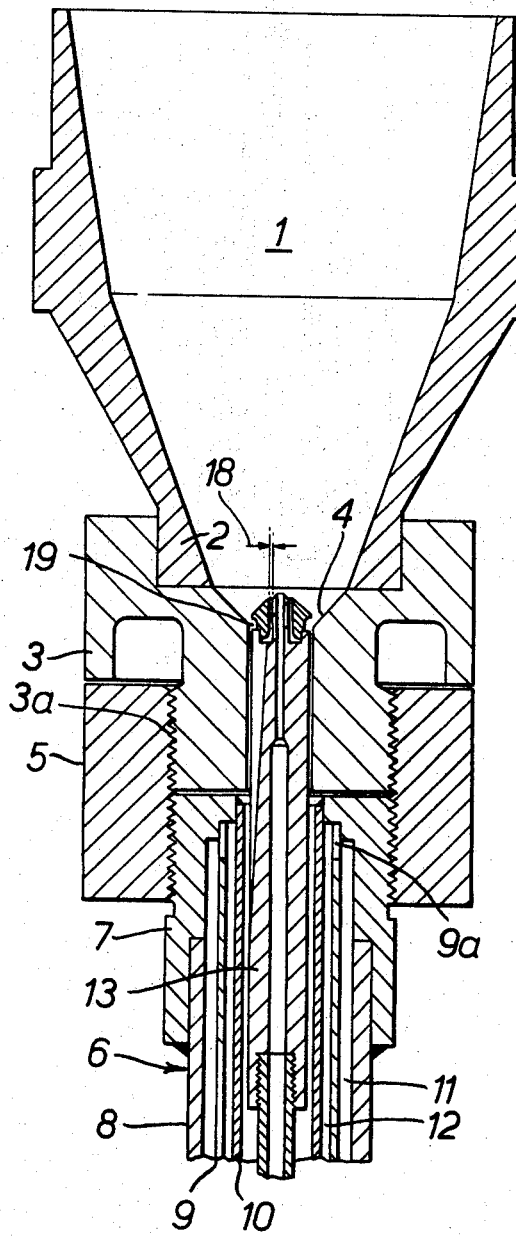
FIG. 1 is an axial cross section through the lower part of the apparatus and the fluid injection assembly taken along the axis of the assembly.

In the drawings FIG. 1 the internally coned graphite base of a tubular fluidized bed vessel 1 has a cylindrically fomed terminal portion 2 which is a close fit into a counter bore in a graphite support ring 3. The internal taper of the vessel 1 merges with a somewhat similarly tapered flared extension 4 at the upper part of the support ring bore. The ring 3 has a screw threaded portion 3a which is engaged by a graphite nut 5, the nut serving also to engage the water-cooled gas injection assembly 6. The latter has an outer sleeve 7 screw threaded externally to engage with the nut 5 which holds the ring 3 and the sleeve 7 together.

Figure 2:
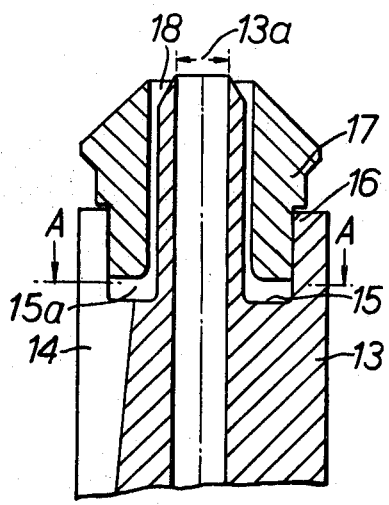
FIG. 2 is an enlarged view of part of FIG. 1, whilst.
Figure 3:
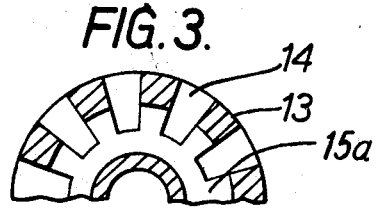
FIG. 3 is a view on the line A—A of FIG. 2.

The bore of the ring 3 receives as a push fit a molybdenum tube 13 which depends from the ring through the sleeve 7 which supports the water-cooling assembly independently of the pipe 13. The outer circumference of the tube 13 has longitudinal grooves 14 which are progressively deeper as the mouth 13a of the tube is approached. The mouth 13a forms a process gas injection orifice. At this end, the tube 13 is of reduced external diameter and the external shoulder formed is counterbored to leave annular groove 15 (FIG. 2) with a proud, marginal, portion 16. Into the recess 15 is inserted a graphite ferrule 17 as a push fit against the inner surface of the proud marginal portion 16. The depth of the groove 15 is such that a gallery 15a is formed at its base, which communicates with all the grooves 14, is such as to leave an annular clearance 18 defining one annular injection orifice for inert gas around the reduced diameter, end portion of the tube 13.

Clear passageways are thus formed between the channels formed by the longitudinal grooves 14 and, firstly, an annular clearance 19 around the the tube 13 with respect to the tapered flared extension 4 of ring 3 and, secondly, an annular injection orifice 18 around the mouth 13a of pipe 13 itself.

The internal diameter of the sleeve 7 is stepped as shown to receive and retain two outer and inner coaxial stainless steel tubes 8, 9 whilst a third, innermost, tube 10, also of stainless steel, is fixed within the sleeve bore. The end of the inner tube 9 which is a push fit within the groove formed by the stepped diameters is perforated at 9a to provide intercommunication between the inner and outer annular spaces 11, 12 which form passageways for the cooling water.

In use, coolant water is passed continuously along the outer tube 8 and passes through the annular spaces 11, 12 whilst inert gas is passed into the annular spaces between tube 10 and tube 13 and hydrocarbon or other process gas is passed into tube 13 itself. As a result, the process gas passes straight into the base of the vessel 1 whilst inert gas flows into the channels between the tapered grooves in the wall of tube 13. At the top of the latter, the inert gas streams emerge from the grooves to enter the gallery 15a and thence into both the clearance 18 to issue as an annular jet around the process gas inlet to the vessel i.e. the tube mouth 13a and as a second annular jet around the ferrule itself. The ferrule is shaped to direct the second annular jet along the flared extension 4 providing surfaces contiguous with the surfaces of the vessel.

The tube 13 is axially adjustable by means not shown so as to allow for varying the proportions of inert gas flow between the annular clearance 19 and the orifice 18.

Both inert flows issue from uninterrupted annular jets or orifices to sweep over the nozzle piece and the vessel surfaces, these annular orifices being constrained to remain coaxial with the process gas injection orifice, irrespective of thermal movements or distortion between the water-cooled part of the assembly and the parts of the device which operate at high temperature. Thermal gradients between these parts are such that, with the available cooling, the tube mouth 13a is cooled sufficiently to prevent deposition of coating substances within the tube 13 and at the same time heat losses from the furnace to the water-cooled parts are kept small. The first effect is accomplished by restricting the area of contact between the tube 13 carrying the process gas and the support ring 3 to the area of the lands of the grooves whilst the second effect is achieved by the employment of the fluidizing fluid as coolant for the tube 13 as it passes from the water-cooled section to the ferrule. Moreover, undesirable heat flow from the coned graphite base 1 to the water-cooled sleeve 7 are markedly reduced in this design which results in distance between the vessel base 1 and the water-cooled section somewhat larger than in many previous designs.

I claim:

1. A fluidized bed coater for coating particulate material with pyrolytic carbon from the gas phase which comprises: a heated furnace portion bounded by a right cylindrical wall; a gas injection assembly positioned to present a vertically upward directed gas injection nozzle for introducing coating gas into said furnace portion coaxially with the furnace wall, said assembly having a fluted periphery defining in cooperation with adjacent portions of the furnace an annular passage for introducing fluidizing gas into said furnace portion; bleed passages directing a bleed of said fluidizing gas from said fluted periphery into a gallery from which it issues into the furnace from passages in close proximity to the coating gas injection nozzle.

2. A fluidized bed coater according to claim 1 including means for directing the fluidizing gas over the surface of said cylindrical wall and means for directing said bleed gas over the mouth of said gas injection nozzle.

3. An apparatus as claimed in claim 1 in which the gas injection assembly comprises a tube having a reduced diameter portion at its end adjacent the furnace portion, the shoulder so formed having an annular groove in its end face to define said annular gallery communicating with the peripheral flutes and a ferrule secured in said annular groove in such a manner as to define an annular passage between the annular gallery and the mouth of the tube.